(12) United States Patent
Zhang et al.

(10) Patent No.: US 10,831,314 B2
(45) Date of Patent: Nov. 10, 2020

(54) METHOD AND ELECTRONIC DEVICE FOR PREVENTING TOUCH BUTTON FROM BEING FALSE TRIGGERED

(71) Applicant: Guangdong Oppo Mobile Telecommunications Corp., Ltd., Dongguan, Guangdong (CN)

(72) Inventors: Qiang Zhang, Guangdong (CN); Yixue Ge, Guangdong (CN); Hao Wang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 131 days.

(21) Appl. No.: 15/699,019

(22) Filed: Sep. 8, 2017

(65) Prior Publication Data

US 2018/0173368 A1 Jun. 21, 2018

(30) Foreign Application Priority Data

Dec. 16, 2016 (CN) .......................... 2016 1 1165123

(51) Int. Cl.
 *G06F 3/0484* (2013.01)
 *G06F 3/041* (2006.01)
 (Continued)

(52) U.S. Cl.
 CPC .......... *G06F 3/0418* (2013.01); *G06F 3/0412* (2013.01); *G06F 3/0482* (2013.01); *G06F 3/04842* (2013.01); *G06F 3/04886* (2013.01)

(58) Field of Classification Search
 None
 See application file for complete search history.

(56) References Cited

U.S. PATENT DOCUMENTS

| | | | |
|---|---|---|---|
| 2009/0289958 A1* | 11/2009 | Kim ......................... | G06F 3/02 345/649 |
| 2011/0141006 A1* | 6/2011 | Rabu ....................... | G01C 21/20 345/156 |

(Continued)

FOREIGN PATENT DOCUMENTS

| | | |
|---|---|---|
| CN | 101860587 A | 10/2010 |
| CN | 101930309 A | 12/2010 |

(Continued)

OTHER PUBLICATIONS

International Search Report issued in corresponding international application No. PCT/CN2017/101574 dated Dec. 21, 2017.

(Continued)

*Primary Examiner* — Parul H Gupta

(57) ABSTRACT

The disclosure provides a method and an electronic device for preventing touch button from being touched, and the method includes operations as follows. When detecting the touch button being touched, obtaining a current screen direction state of the electronic device. When the screen direction state is the first direction state, determining a touch operation on the touch button and judging whether the touch operation is a predefined touch operation. When the touch operation is the predefined touch operation, reporting a key value of the touch button to trigger a function of the touch button.

14 Claims, 8 Drawing Sheets

(51) Int. Cl.
*G06F 3/0488* (2013.01)
*G06F 3/0482* (2013.01)

(56) References Cited

U.S. PATENT DOCUMENTS

2011/0279223 A1* 11/2011 Hatambeiki .......... G06F 3/0346
340/4.3
2014/0145989 A1* 5/2014 Lee ..................... G06F 3/04886
345/173

FOREIGN PATENT DOCUMENTS

| CN | 103699298 A | 4/2014 |
| CN | 104238759 A | 12/2014 |
| CN | 105264479 A | 1/2016 |
| CN | 105791561 A | 7/2016 |
| CN | 105808049 A | 7/2016 |
| CN | 106201307 A | 12/2016 |
| CN | 106210289 A | 12/2016 |
| CN | 105791981 A | 7/2018 |
| WO | 2014105274 A1 | 7/2014 |
| WO | 2016040720 A1 | 3/2016 |

OTHER PUBLICATIONS

Partial European Search Report issued in corresponding European application No. 17188943.9 dated Feb. 12, 2018.
Extended European search report issued in corresponding European application No. 17188943.9 dated May 22, 2018.
English translation fo the first OA issued in corresponding CN application No. 201611165123.6 dated Nov. 22, 2018.
English translation of the second OA issued in corresponding CN application No. 201611165123.6 dated Jan. 15, 2019.
Communication pursuant to Article 94(3) EPC issued in corresponding European application No. 17188943.9 dated Jan. 10, 2019.
Examination report issued in corresponding IN application No. 201734033552 dated Nov. 13, 2019.

* cited by examiner

US 10,831,314 B2

METHOD AND ELECTRONIC DEVICE FOR PREVENTING TOUCH BUTTON FROM BEING FALSE TRIGGERED

CROSS-REFERENCE TO RELATED APPLICATION(S)

This application claims priority to Chinese Patent Application No. 201611165123.6, filed on Dec. 16, 2016, the content of which is hereby incorporated by reference in its entirety.

TECHNICAL FIELD

This disclosure relates generally to a touch screen technical filed, and more particularly relates to a method and a device for preventing false triggering on a touch button.

BACKGROUND

Following the development of the information technology, touch screens as one type of input devices, are widely used in terminal devices such as mobile phones, tablet computers, media players, etc. One type of touch screens is a sensed liquid crystal display (LCD) device capable of receiving input signals from its touch terminals, when a graphical button of a display screen of the sensed LCD device is touched by a user, a touch feedback system of the display screen may drive corresponding connected components according to a precompiled program, and may produce lively audio and video effects via display pictures of the sensed liquid crystal display (LCD) device.

As a new input device, the touch screen can provide a most simple, convenient, and natural human-machine interaction mode at present. However, due to the character of the touch screen, the touch screen sometimes also brings inconvenient for the user. For example, when the user is playing games or watching videos, if the user's finger touches a touch button by carelessly, thus to false trigger an operation to back to a main interface or interrupt the games or videos, which brings inconvenient for the user.

SUMMARY

Implementations of the disclosure provide a method and an electronic device for preventing false triggering on a touch button, to reduce the occurrence of false triggering the touch button.

The implementations of the disclosure provides a method for preventing touch button of an electronic device from being false triggered, comprising: obtaining a current screen direction state of the electronic device, when detecting a touch button of the electronic device being touched; determining a touch operation on the touch button and judging whether the touch operation is a predefined touch operation, when the screen direction state is the first direction state; and reporting a key value of the touch button to trigger a function of the touch button, when the touch operation is the predefined touch operation.

The implementations of the disclosure further provide an electronic device, the electronic device comprises a touch button, a processor, and a memory. The memory stores a plurality of instructions, the plurality of instructions being executed by the processor and causing the processor to: obtain a current screen direction state of the electronic device when detecting a touch button of the electronic device being touched; determine a touch operation on the touch button and judging whether the touch operation is a predefined touch operation when the screen direction state is the first direction state; and report a key value of the touch button to trigger a function of the touch button when the touch operation is the predefined touch operation.

The implementations of the disclosure further provides a non-transitory computer-readable storage medium, wherein the non-transitory computer-readable storage medium stores a plurality of instructions, when the plurality of instructions is executed by a computer, the computer is caused to execute a method for preventing touch button from being false triggered, the method comprises: obtaining a current screen direction state of the electronic device, when detecting a touch button of the electronic device being touched; determining a touch operation on the touch button and judging whether the touch operation is a predefined touch operation, when the screen direction state is the first direction state; and reporting a key value of the touch button to trigger a function of the touch button, when the touch operation is the predefined touch operation.

According to the method, the electronic device, and the non-transitory computer-readable storage medium provided by implementations of the disclosure, though obtaining the current screen direction state, and determining what the touch operation on the touch button is when the screen direction state is the first direction state. Furthermore, by judging whether the touch operation is the predefined touch operation to determine whether to report the key value of the touch button. Thus, the problem of false triggering the touch button to interrupt the running application is resolved, and the effect of reducing the false triggering is achieved.

DETAILED DESCRIPTION

The present disclosure will now be described in further detail with reference to the accompanying drawings and implementations, in which the objects, solutions, and advantages of the disclosure will become more apparent. It is to be understood that the specific implementations described herein are merely illustrative of the disclosure and are not intended to limit the disclosure. Furthermore, in order to facilitate to describe the disclosure, the drawings only show the structures related to the present disclosure, not all of the structures.

Which should be referred before detail discussing the implementations is: some implementations are described as processing or method as illustrated in flowcharts. Although the flowcharts describe the operations in a certain order, there are many operations of the flowcharts can be executed in parallel or simultaneously. Besides, the order of each operation can be alternated. When the last operation of one flowchart is executed completely, the processing of the flowchart can be terminated or can include additional operations not illustrated in the flowchart. The processing described in the flowchart can correspond to methods, functions, subprocess, etc.

Figure 1:
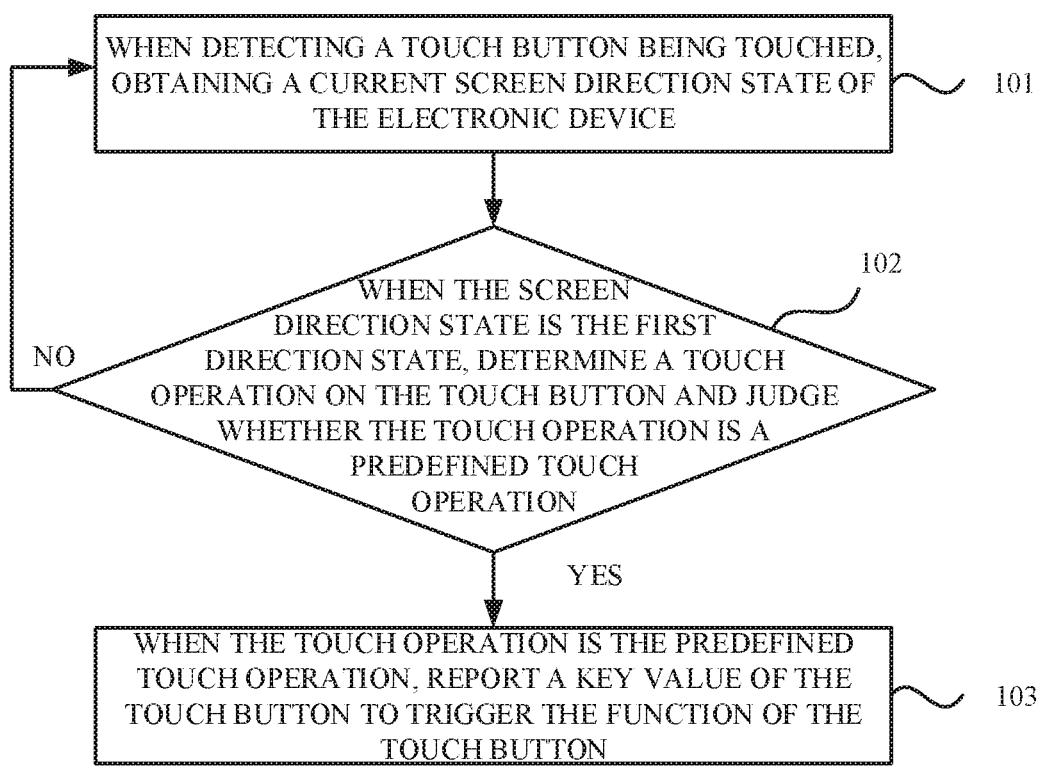
FIG. 1 is a flowchart illustrating a method for preventing touch button from being false triggered, according to an implementation of the disclosure.
Figure 2:
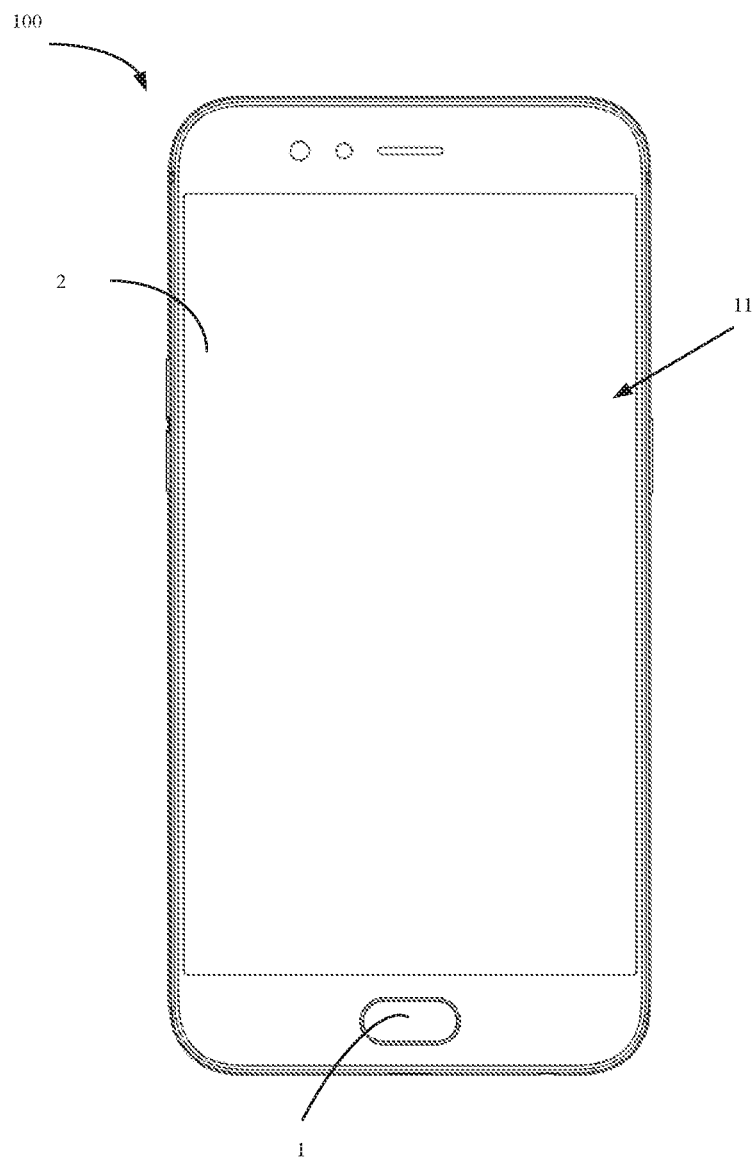
FIG. 2 is a schematic diagram of an electronic device applied in the method for preventing touch button from being false triggered, according to an implementation of the disclosure.

FIG. 1 is a flowchart of a method for preventing touch button from being false triggered, provided by an implementation of the disclosure. The method is applied to an electronic device 100 as illustrated in FIG. 2, and is used to prevent false triggering one or more touch buttons of the electronic device 100. As illustrated in FIG. 1, the method may begin at block 101.

At block 101, the method may include obtaining a current screen direction state of the electronic device 100 when detecting a touch button 1 of the electronic device 100 being touched.

In one implementation, the current screen direction state includes a first direction state and a second direction state. In the implementation, the first direction state can be a landscape state, the second direction state can be a portrait screen state. In another implementation, the first direction state can be the portrait screen state, the second direction state can be the landscape state. In the landscape state, a top portion of the contents displayed on the electronic device 100 is at a right side or a left side of the electronic device 100. In the portrait screen state, the top portion of the contents displayed on the electronic device 100 is at an upper side or a bottom side of the electronic device 100.

For example, when the user uses the electronic device 100 to watch videos or play games, the electronic device 100 usually is at the landscape state according to a place state of the electronic device 100 operated by the user, thus facilitating the user to watch videos and play games. When the user uses the electronic device 100 to send a message or make a call, the electronic device 100 usually is at the portrait screen state according to the place state of the electronic device 100 operated by the user. Therefore, the screen direction state of the electronic device 100 is related to the operation of the user.

At block 102, the method may include determining a touch operation on the touch button 1 and judging whether the touch operation is a predefined touch operation when the screen direction state is the first direction state. In the disclosure, determining the touch operation on the touch button 1 means that determining what the touch operation is. When the touch operation is the predefined touch operation, the process turns to block 103, when the touch operation is not the predefined touch operation, the process ends or returns to the block 101, or jumps to other blocks not illustrated in FIG. 1, here does not make limitations.

The touch operation can include different types touch operations, such as a click operation, a slide operation, a long time pressing operation, etc.

FIG. 2 illustrates the electronic device 100 related to the method for preventing false triggering on the touch button, in one implementation of the disclosure. As illustrated in FIG. 2, the electronic device 100 includes the touch button 1 and the touch screen 11, the touch screen 11 includes a touch area 2. Therein, the touch area 2 is the area for display content such as pictures, videos, of the touch screen 11. The touch button 1 can be a "HOME" key for quickly back to a main interface, a "back" key for back to the last menu level, the last page, etc., or a "menu" key for quickly enter a menu, and other keys outside of the touch screen 11. The touch button 1 can be a capacitive sensing key independent from the touch screen 11, or can be a capacitive sensing key achieved according to the sensing circuit of the touch screen 11. Namely, the touch button 1 and the touch screen 11 can use the same sensing circuit or the different sensing circuits.

In one implementation, the touch operation is the operation that the user touches the touch button 1. The touch operation includes a click operation with information of click times or a press operation with information of pressing duration and/or pressure value. When the screen direction state is the first direction state, by detecting the touch operation for the touch button 1 of the user to determine the type of the touch operation. For example, by detecting the click times of the touch operation to further determine the type of the touch operation is a single click operation or a double click operation, etc. In one implementation, the touch button 1 is a designated touch area labeled as a corresponding touch icon.

The touch screen 11 adopted by the electronic device 100 can be a resistive touch screen, a capacitive touch screen, or a piezoelectric touch screen, when the user touches the touch screen 11, the touch screen 11 would detect touch information and identify the touch operation according to the touch information. Here, take the capacitive touch screen as an example, the touch screen 11 can detect changes in the capacitance value, when the user touches the touch screen 11, the touch screen 11 detects the changes in the capacitance value to generate the touch information. The touch information may include but not limited to x coordinate, y coordinate, a size of a contact area (include length and width), a number of touch fingers, touch pressure, touch duration, etc. After the touch screen 11 generate the touch information, the touch screen 11 transmits the touch information to a upper-level application system via an input system, thus enables the upper-level application system to determine the touch position, the touch pressure, the touch duration, etc., by using the touch information.

The touch button 1 can also be a resistive touch button, a capacitive touch button, or a piezoelectric touch button. The touch button 1 can generate touch information in response to a touch operation on it. The touch information generated by the touch button 1 can also include but not limited to: x coordinate, y coordinate, a size of a contact area (include length and width), a number of touch fingers, touch pressure, touch duration, etc.

In one implementation, the electronic device 100 can be a device such as a mobile phone or a tablet computer equipped with the touch screen. When the screen direction state is the first direction state, detects the click times of the touch operation on the touch button 1 to determine whether the touch operation is the single click operation or the double click operation, etc. For example, the screen direction state of the electronic device 100 usually is the landscape state when the user is playing a game, the user can execute each action of the game by input different touch operations on the touch screen 11, such as the click operation, the slide operation, etc. Therefore, the touch button 1 may be touched by the user by careless or touched by the user when the user intends to exit the game. Thus, through determining the type of the touch operation, whether the touch operation on the touch button 1 is a false operation can be distinguished.

At block 103, the method may include reporting a key value of the touch button 1 to response the touch operation on the touch button 1 when the touch operation is the predefined touch operation, thus to trigger the function of the touch button 1 when the touch operation is the predefined touch operation. Therein, the predefined touch operation can be a click operation with at least two click times, a touch operation whose pressure value excesses a preset pressure value, or a touch operation whose touch duration excesses a preset duration.

Of course, when the touch operation is not the predefined touch operation, the key value of the touch button 1 would not be reported and the function of the touch button would not be triggered.

In one implementation, the predefined touch operation is a double click operation, namely, after the touch button 1 is touched by the user, the touch button 1 is touched by the user again in a short time. When the user touches the same touch button 1 at least twice in a short time (e.g., 2 seconds), which represents that the user intends to operate the touch button, not by mistake, therefore, in that condition, the key value can be reported to the upper-level application system, such as a processor of the electronic device 100, thus causing the electronic device 100 responses the key value and triggering the function of the touch button 1. Therein, the double click operation is: an interval of at least two clicks is less than a preset time, and the two clicks are sequential clicks, namely, there are no other operations between the two clicks.

In some implementations, the predefined touch operation can be the touch operation whose pressure value excesses the preset pressure value. Through detecting the pressure value of the touch operation, when the pressure value of the touch operation excesses the preset pressure value, the touch operation is determined as the predefined touch operation; thus reporting the key value of the touch button 1 and causing the electronic device 100 to response the touch operation and trigger the function of the touch button 1. In some implementations, the predefined touch operation can be the touch operation whose touch duration excesses the preset duration. Through detecting the touch duration of the touch operation, when the touch duration of the touch operation excesses the preset touch duration, the touch operation is determined as the predefined touch operation; thus reporting the key value of the touch button 1 and causing the electronic device 100 responses the touch operation to trigger the function of the touch button 1. Therein, if the pressure value of the touch operation is less than the preset pressure value or the touch duration of the touch operation is less than the preset touch duration, the key value of the touch button 1 would not be reported to the upper-level application system, thus preventing false triggering on the touch button 1 effectively.

Therein, the key value of the touch button 1 is used to trigger to execute the function of the touch button 1. For example, if the touch button 1 is a "back" key and the function of the touch button 1 is back to the last menu level or the last page, when the key value of the touch button 1 is reported, the function of the touch button 1 would be triggered.

In one implementation, the electronic device 100 is taken as a smart phone for example. When the user uses the smart phone watches videos, such as television programs, the screen direction state of the smart phone usually is adjusted to the landscape state. The user can slide his/her finger from left to right or from right to left to execute a fast forward function or a fast backward function, the user also can slide his/her finger from up to down or from down to up to execute a volume adjustment function. Furthermore, the user also can click an icon of next episode to execute a function of jumping to the next episode of the television program. However, when the user inputs the above operations, the user maybe also touch the touch button 1 by mistake or careless, in that condition, if the user false touches the touch button 1, the user usually only touch the touch button 1 one time, or the pressure value of the touch operation usually is small, or the touch duration of the touch operation usually is short. Therefore, if the user touches the touch button 1 twice in a short time, or the pressure value of the touch operation is greater than the preset pressure value, or the touch duration of the touch operation is greater than the preset time duration, then indicates that the user intends to trigger the function of the touch button 1 and reports the key value of the touch button 1 and responses the touch operation. For example, if the touch button 1 can be a "HOME" key, when the key value of the "HOME" key is reported, thus triggering the function of stop or interrupt playing the television program and back to the main interface.

For example, as described above, the electronic device 100 is taken as the smart phone for example, when the user uses the electronic device 100 to watch videos, the screen direction state is the landscape state. If the touch button 1 is the "back" key and the predefined touch operation is the click operation with at least two click times, the user needs to click the "back" key at least twice to trigger the function of the "back" key. Namely, the key value of the "back" key would be reported to the upper-level application system only when the user clicks the "back" key at least twice, the upper-level application system responses the key value of the "back" key and executes the function of backing to the last menu level.

According to the above implementations of the disclosure, through obtaining the screen direction state and judging whether the touch operation on the touch button 1 is the predefined touch operation when the screen direction state is the first direction state; when the touch operation is the predefined touch operation including a click operation with at least two click times, a touch operation whose pressure value excesses a preset pressure value, or a touch operation whose touch duration excesses a preset duration, reporting the key value of the touch button 1 to trigger to execute the function of the touch button 1. Therefore, in the implementations, when the screen direction state is the first direction state, it needs to detect what the touch operation is, and judge whether the touch operation is the predefined touch operation, the touch operation is responded only when the touch operation is the predefined touch operation. Thus, the problem of false triggering to back to the main interface or interrupt the running application is resolved, and the effect of reducing or preventing the false triggering is achieved.

Figure 3:
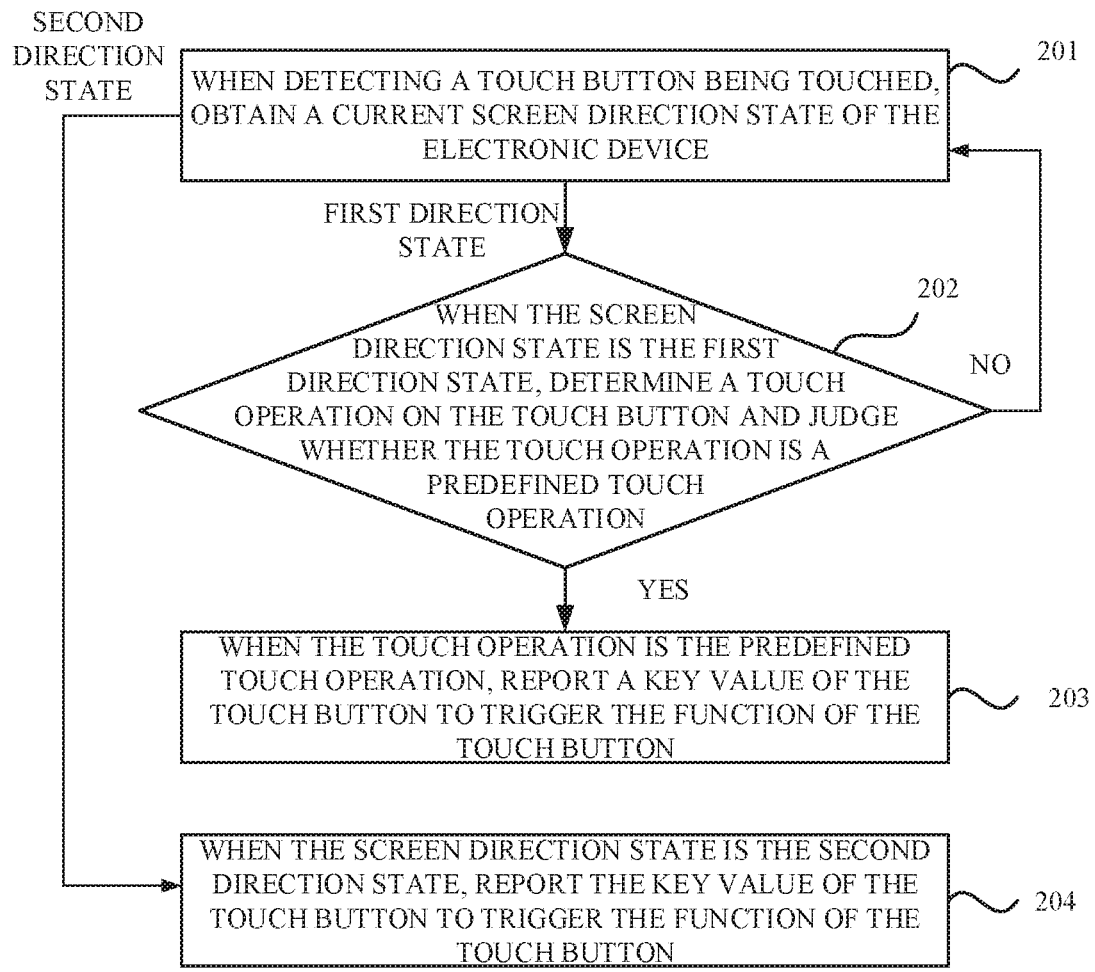
FIG. 3 is a flowchart illustrating a method for preventing touch button from being false triggered, according to another implementation of the disclosure.

FIG. 3 is a flowchart illustrating a method for preventing touch button from being false triggered, in another implementation of the disclosure. In the implementation, the method is improved based on the method illustrated in FIG. 1. In the implementation, the method further includes: reporting the key value of the touch button 1 in response to the touch operation on the touch button 1 when the screen direction state is the second direction state.

Correspondingly, the method includes the following operations and may begin at block 201.

At block 201, the method may include obtaining a current screen direction state of the electronic device 100 when detecting the touch button 1 of the electronic device 100 being touched. If the current screen direction state is the first screen direction state, the process turns to block 201, if the current screen direction state is the second screen direction state, the process turns to block 204.

At block 202, the method may include determining a touch operation on the touch button 1 and judging whether the touch operation is a predefined touch operation, when the screen direction state is the first direction state. If the touch operation is the predefined touch operation, the process turns to the block 203, else, the process ends or returns to block 201, here does not make limitations.

At block 203, the method may include reporting a key value of the touch button 1 to response the touch operation on the touch button 1 when the touch operation is the predefined touch operation, thus to trigger the function of the touch button 1 when the touch operation is the predefined touch operation. Therein, the predefined touch operation can be a click operation with at least two click times, a touch operation whose pressure value excesses a preset pressure value, or a touch operation whose touch duration excesses a preset duration.

At block 204, the method may include reporting the key value of the touch button 1 to trigger the function of the touch button 1 in response to the touch operation on the touch button 1 when the screen direction state is the second direction state.

In the implementation, if the screen direction state is the second direction state, which means that the user is sending messages, watching webpages, etc., then the touch operation on the touch button 1 can be responded as normally. Namely, when the screen direction state is the second direction state, if any touch operation is applied on the touch button 1, the key value of the touch button 1 would be reported and the function of the touch button 1 would be triggered. For example, when the screen direction state is the second direction state, if there is a single click operation applied on the touch button 1, the key value of the touch button 1 would be reported and the function of the touch button 1 would be triggered.

In the implementation, the electronic device 100 is a smart phone, when the user uses the smart phone to send a message, the smart phone usually is at the portrait screen state, in that situation, the touch button 1 usually would not be false touched by the user. Therefore, if there is any touch on the touch button 1, the key value of the touch button 1 would be reported and the function of the touch button 1 would be triggered, such as, back to the main interface.

In the implementation, the electronic device 100 is a smart phone, and the touch button 1 is the "back" key. When the user uses the smart phone to send message, the smart phone usually is at the portrait screen state, each time when the "back" key is touched by the user, the key value of the "back" key would be reported to the upper-level application system to trigger the upper-level application system to execute the function of the "back" key.

According to the method for preventing false triggering on the touch button 1, provided by the implementation of the disclosure, when the screen direction state is the portrait screen state, if any touch operation on the touch button 1 is detected, the key value of the touch button 1 would be reported. When the screen direction state is the portrait screen state, the touch button 1 would not be false touched by the user normally, there is no need to detect what the touch operation is. Therefore, once the touch button 1 is touched by the user in any touch operations, the key value of the touch button 1 is reported and the function of the touch button 1 is triggered, thus enhancing the response speed and bringing better experience for the user.

Figure 4:
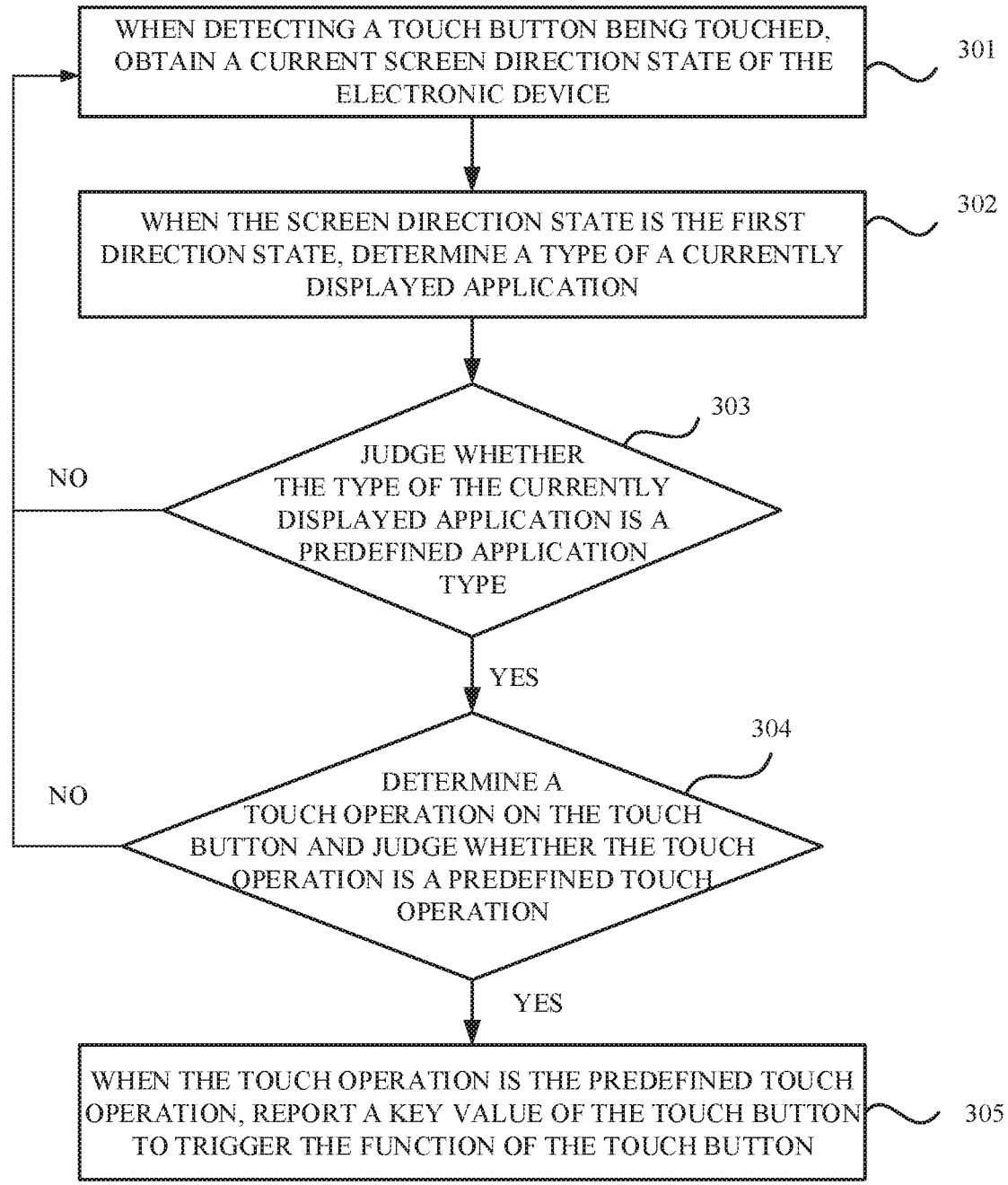
FIG. 4 is a flowchart illustrating a method for preventing touch button from being false triggered, according to further another implementation of the disclosure.

FIG. 4 is a flowchart illustrating a method for preventing touch button from being false triggered, in further another implementation of the disclosure. In the implementation, the method is improved based on the methods illustrated in FIGS. 1 and 3. In the implementation, the operation of determining the touch operation on the touch button 1 and judging whether the touch operation is the predefined touch operation when the screen direction state is the first direction state is improved as: determining a type of an application displayed on the touch screen 11 currently when the screen direction state is the first direction state; and determining the touch operation on the touch button 1 when the application is a predefined application, namely, determining what the touch operation is when the application is a predefined application.

Corresponding, the method includes the following operations and may begin at block 301.

At block 301, the method may include obtaining a current screen direction state of the electronic device 100 when detecting the touch button 1 of the electronic device 100 being touched. If the current screen direction state is the first screen direction state, the process turns to block 302, if the current screen direction state is the second screen direction state, the process turns to block 304.

At block 302, the method may include determining the type of a currently displayed application when the screen direction state is the first direction state.

In one implementation, the application can include different types, for example, the application can include but not limited to: a social application, a map navigation application, an online shopping and payment application, a telephone communication application, a consumer application, a searching application, a camera application, a video player application, a reader application, a browser application, and a game application. The application displayed on the touch screen 11 can be any applications installed in the electronic device 100.

At block 303, the method may include judging whether the type of the currently displayed application is a predefined application type. If the type of the currently displayed application is the predefined application type, the process turns to block 304, if not, the process ends or returns to block 301, or turns to an operation of reporting the key value of the touch button 1 to trigger the function of the touch button 1, here does not make limitations.

At block 304, the method may include determining a touch operation on the touch button 1 and judging whether the touch operation is a predefined touch operation, when the type of the application is predefined application type. If the touch operation is the predefined touch operation, the process turns to block 305, if not, the process ends or returns to block 301, here does not make limitations.

In one implementation, the predefined application type can be the video player application type, the game application type, and other application types that may cause the user to false trigger the touch button 1 when the user focus on the application. If the type of the displayed application is the same as the predefined application type, that reflects the electronic device 100 is in the situation of easily being false triggered, thus determining what the touch operation is and judging whether the touch operation is the predefined touch operation.

In the implementation, the electronic device 100 is a smart phone, the screen direction state of the smart phone is the landscape state, and the predefined application is the video player application. When determining the application currently displayed is the same as the predefined application, namely is also the video player application, then determining the touch operation on the touch button 1, namely determining what the touch operation is, such as, determining the touch operation by detecting the click times of the touch operation.

At block 305, the method may include reporting a key value of the touch button 1 to response the touch operation on the touch button 1 when the touch operation is the predefined touch operation, thus to trigger the function of the touch button 1 when the touch operation is the predefined touch operation. Therein, the predefined touch operation can be a click operation with at least two click times, a touch operation whose pressure value excesses a preset pressure value, or a touch operation whose touch duration excesses a preset duration.

In the implementation, the electronic device 100 is the smart phone, and the touch button 1 is the "back" key. When the screen direction state of the electronic device 100 is the landscape state and the type of the displayed application is the predefined application type, such as the video player application type, then determining the touch operation on the touch button 1, such as determining the click times of the touch operations. When the "back" key is touched at least twice, then the key value of the "back" key would be reported to the upper-level application system, the upper-level application system receives the key value of the "back" key and executes the function of backing to the last menu level in response to the received key value.

According to the method for preventing false triggering on the touch button 1, provided in the implementation of the disclosure, when the screen direction state is the first screen state, then obtaining the type of the currently displayed application, and determining the touch operation when the type of the currently displayed application is the predefined application. When the touch operation is the predefined touch operation including a click operation with at least two click times, a touch operation whose pressure value excesses a preset pressure value, or a touch operation whose touch duration excesses a preset duration, reporting the key value of the touch button 1 to trigger to execute the function of the touch button 1. Through further judging whether the type of the application is the predefined application which would easily cause the touch button to be false triggered, thus the probability of false triggering the touch button 1 can be further reduced.

Figure 5:
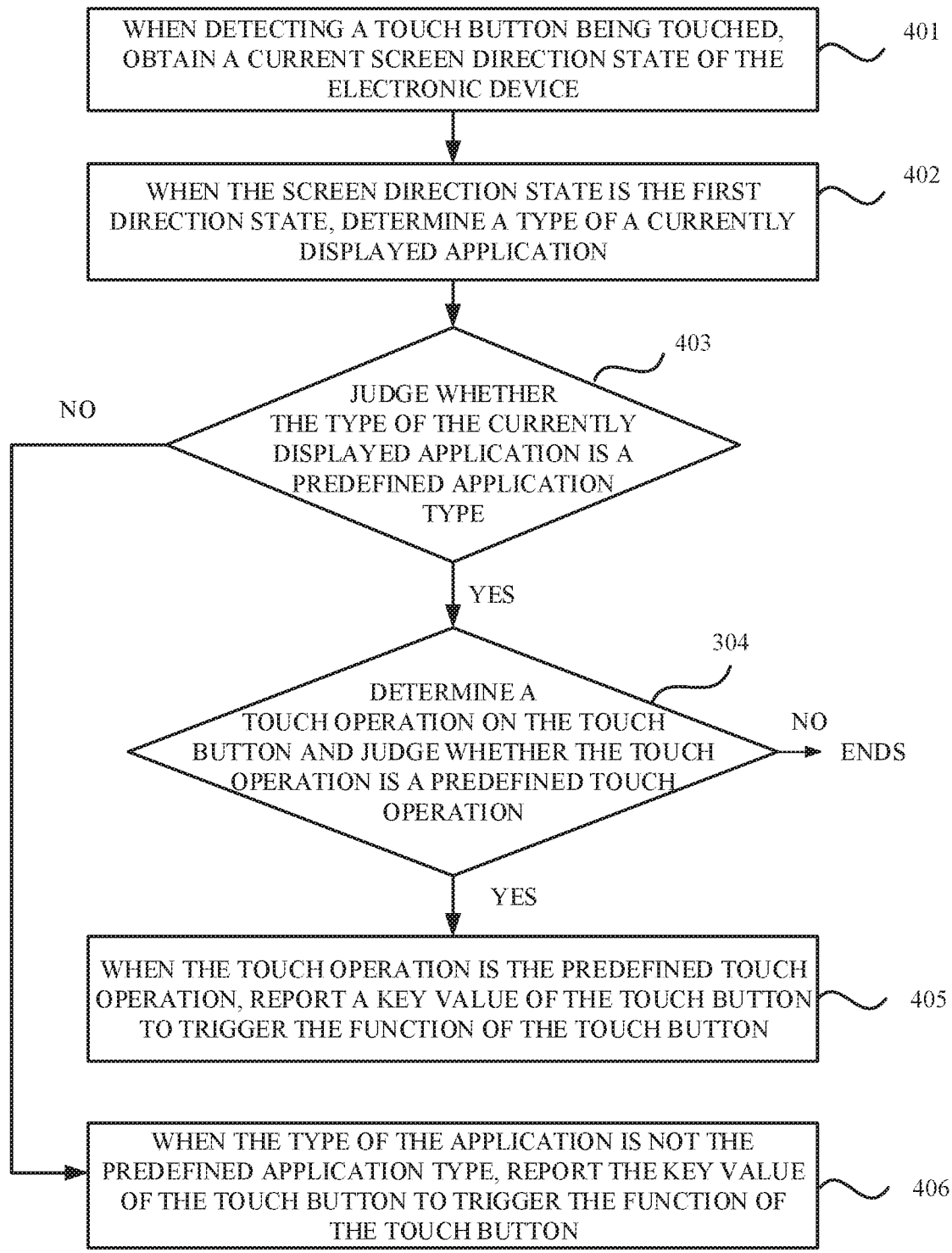
FIG. 5 is a flowchart illustrating a method for preventing touch button from being false triggered, according to further another implementation of the disclosure.

FIG. 5 is a flowchart illustrating a method for preventing touch button from being false triggered, in further another implementation of the disclosure. In the implementation, the method is improved based on the method illustrated in FIG. 4. In the implementation, after the operation of obtaining the type of a currently displayed application, the method further includes: reporting the key value of the touch button 1 in response to the touch operation on the touch button 1 when the type of the currently displayed application is not the predefined application type.

Corresponding, the method includes the following operations and may begin at block 401.

At block 401, the method may include obtaining a current screen direction state of the electronic device 100 when detecting the touch button 1 of the electronic device 100 being touched.

At block 402, the method may include determining the type of the currently displayed application when the screen direction state is the first direction state. Namely, when the screen direction state is the first direction state, determining which type the currently displayed application is.

At block 403, the method may include judging whether the type of the application is a predefined application type. If the type of the application is the predefined application type, the process proceeds to block 404, otherwise, the process proceeds to block 406.

At block 404, the method may include determining a touch operation on the touch button 1 and judging whether the touch operation is a predefined touch operation when the type of the application is predefined application type. If the touch operation is the predefined touch operation, the process turns to block 405, if not, the process ends or returns to block 401, here does not make limitations.

At block 405, the method may include reporting a key value of the touch button 1 to response the touch operation on the touch button 1 when the touch operation is the predefined touch operation, thus to trigger the function of the touch button 1 when the touch operation is the predefined touch operation. Therein, the predefined touch operation can be a click operation with at least two click times, a touch operation whose pressure value excesses a preset pressure value, or a touch operation whose touch duration excesses a preset duration.

At block 406, the method may include reporting the key value of the touch button 1 to trigger the function of the touch button 1 when the type of the application is not the predefined application type.

In the implementation, when the type of the application is not the predefined application type, if the touch button 1 is touched, the key value of the touch button 1 would be reported to the upper-level application system no matter what the touch operation is, thus causing the upper-level application system to execute the function in response to the key value.

In the implementation, the electronic device 100 is the smart phone, and the touch button 1 is the "back" key. When the user uses the electronic device 100 to chat with others and the screen direction state of the electronic device 100 is the portrait state, if the type of the displayed application is not the predefined application type, such as the video player application type, then once the "back" key is touched, the key value of the "back" key would be reported to the upper-level application system soon. The upper-level application system receives the key value of the "back" key and executes the function of back to the last menu level in response to the received key value.

According to the method for preventing false triggering on the touch button 1, provided by the implementation of the disclosure, when the type of the displayed application is not the predefined application type, then reporting the key value of the touch button 1 in response to any touch operation on the touch button. By further considering the type of the currently displayed application, whether the touch operation on the touch button 1 is false triggered can be determined more correct. Thus resolving the problem of false triggering to back to the main interface or interrupt the running application, and achieving the effect of reducing the false triggering. Furthermore, the touch operation on the touch button 1 can be quickly responded when the type of the currently displayed application is not the predefined application type.

Figure 6:
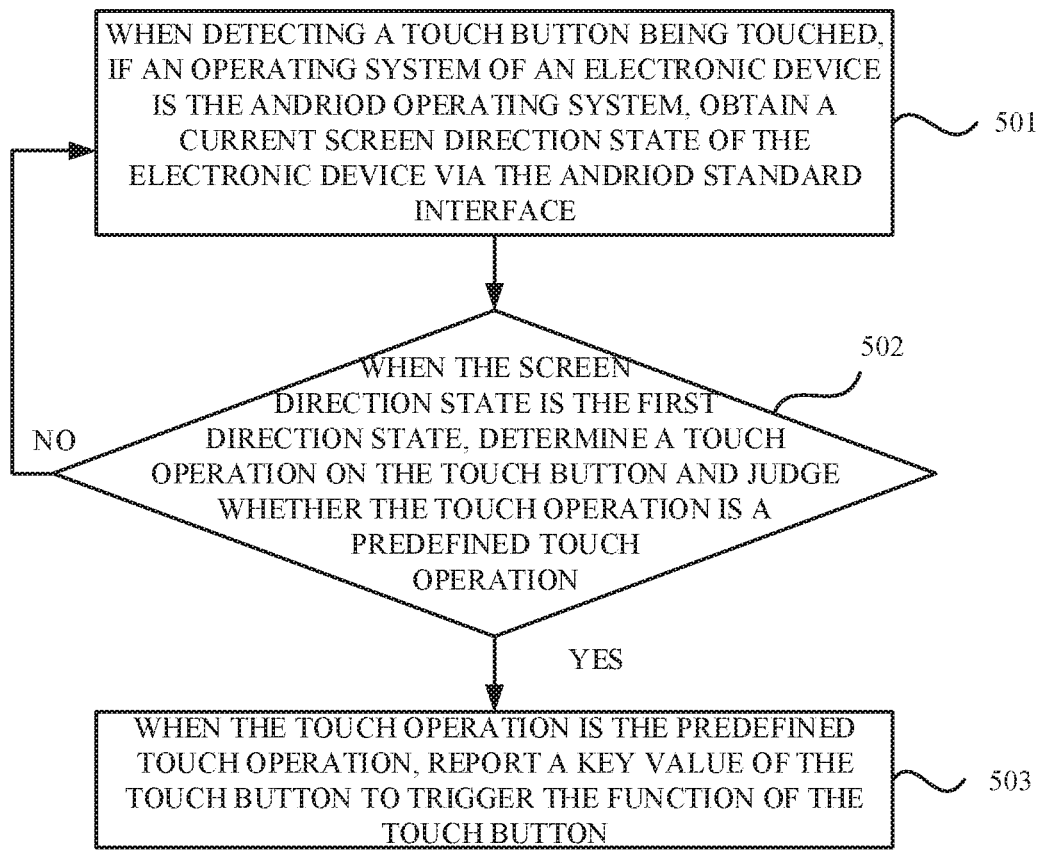
FIG. 6 is a flowchart illustrating a method for preventing touch button from being false triggered, according to other implementations of the disclosure.

FIG. 6 is a flowchart illustrating a method for preventing touch button from being false triggered, in other implementations of the disclosure. In the implementation, the method is improved based on the methods illustrated in FIGS. 1-5. In the implementation, the operation of obtaining a current screen direction state of the electronic device 100 includes: when the operating system of the electronic device 100 is a first operating system (e.g., the Android operating system), obtaining the current screen direction state of the electronic device 100 via a standard interface of the first operating system (e.g., an Android standard interface).

Corresponding, the method includes the following operations and may begin at block 501.

At block 501, the method may include obtaining the current screen direction state of the electronic device 100 via the standard interface of the first operating system when detecting the touch button 1 of the electronic device 100 being touched, if the operating system of the electronic device 100 is the first operating system In the implementation, when the operating system of the electronic device 100 is the Android operating system, obtaining the current screen direction state of the electronic device 100 can be achieved via the Android standard interface. There is two method to obtain the screen direction state: one method is "getResources( ).Get Configuration( ).orientation" and another method is "getRequestedOrientation( )". Therein, "getResources( ).Get Configuration( ).orientation" is used to obtain the direction of content displayed on the touch screen 11, and "getRequestedOrientation( )" is used to obtain the direction of a request.

In the Android operating system, "Activity" is one of four common and primary assemblies ("Activity", "Service", "Content Provider", and "BroadcastReceiver") of the Android assembly. "Activity" is an application assembly providing a screen, "Activity" enables the user to interact with the electronic device 100 to accomplish a task. All of the operations of the "Activity" are related to the user, the "Activity" is the assembly used to interact with the user and can display designated widgets via "setContentView (View)". In an Android application, the "Activity" usually is an independent screen, the "Activity" can display some widgets on it and can detect and response the event input by the user. Components of the "Activity" can communicate with each via an internal data channel. There are two methods to judge whether the "Activity" is the landscape state or the portrait screen state, one method to judge whether the "Activity" is the landscape state or the portrait screen state is according to the configuration information of the electronic device 100, another method to judge whether the "Activity" is the landscape state or the portrait screen state is according to the resolution of the screen. In detail, the method of judging whether the "Activity" is the landscape state or the portrait screen state according to the configuration information of the electronic device 100 includes following operations.

Configuration cf=this.getResources( ).get Configuration( );//obtain the configuration information.
      int ori=cforientation;//obtain the screen direction.
      if(ori==cf.ORIENTATION_LANDSCAPE){//landscape}
      else if(ori==cf.ORIENTATION_PORTRAIT){//portrait screen}

The method of judging whether the "Activity" is the landscape state or the portrait screen state according to the resolution of the screen includes following operations:

DisplayMetrics dm=new DisplayMetrics( );
    mLauncher.getWindowManager( ).getDefaultDisplay( ).getMetrics(dm);
    mWidth=dm.widthPixels;
    mHeight=dm.heightPixels;
    if(mHeight>mWidth){//layout port//portrait screen}else{//layout land//landscape}.

In the implementation, the screen direction state can be obtained according to the above methods.

At block 502, the method may include determining the touch operation on the touch button 1 and judging whether the touch operation is a predefined touch operation when the screen direction state is the first direction state.

At block 503, the method may include reporting a key value of the touch button 1 to response the touch operation on the touch button 1 when the touch operation is the predefined touch operation, thus to trigger the function of the touch button 1 when the touch operation is the predefined touch operation. Therein, the predefined touch operation can be a click operation with at least two click times, a touch operation whose pressure value excesses a preset pressure value, or a touch operation whose touch duration excesses a preset duration.

According to the method for preventing false triggering on the touch button 1, provided by the implementation of the disclosure, when the operating system of the electronic device 100 is the first operating system, the screen direction state can be obtained via the standard interface of the first operating system quickly and conveniently, which facilitates the subsequent processing, thus reducing the occurrence of false triggering the touch button 1 and enhancing the experience for the user.

Figure 7:
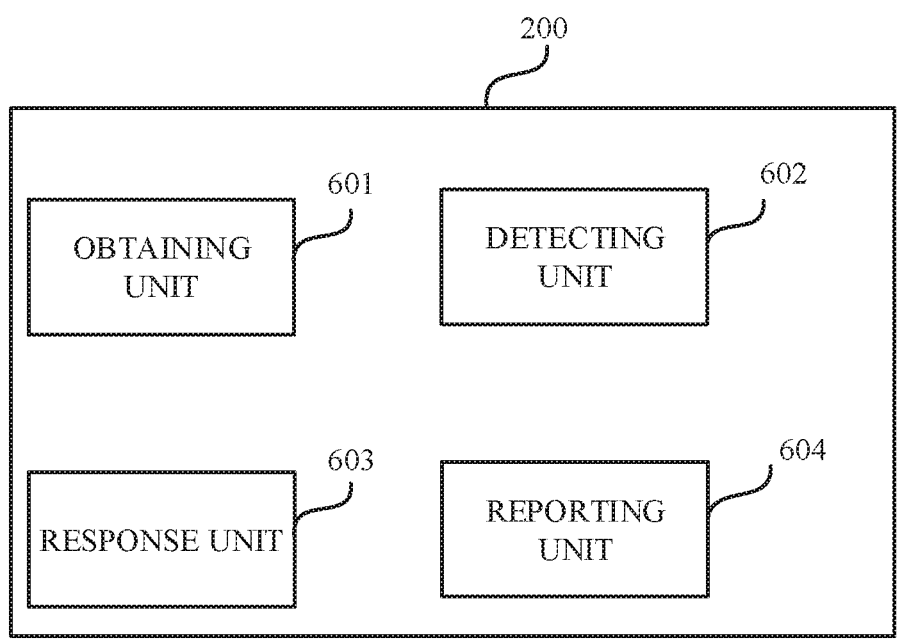
FIG. 7 is a block diagram of a device for preventing touch button from being false triggered, according to an implementation of the disclosure.

FIG. 7 is a block diagram of a device 200 for preventing false triggering on the touch button. Therein, the device 200 can be hardware or software, and can be integrated into the electronic device 100 as illustrated in FIG. 2. The device 200 can execute the method for preventing false triggering on the touch button to control the touch screen 11 of the electronic device 100. As illustrated in FIG. 7, the device 200 includes an obtaining unit 601, a detecting unit 602, and a response unit 603.

The obtaining unit 601 is used to obtain the current screen direction state when detecting a touch button 1 of the electronic device 100 being touched. The detecting unit 602 is used to judge whether the touch operation is the predefined touch operation. The response unit 603 is used to report the key value of the touch button 1 to response the touch operation on the touch button 1, when the touch operation is the predefined touch operation. Therein, the predefined touch operation can be a click operation with at least two click times, a touch operation whose pressure value excesses a preset pressure value, or a touch operation whose touch duration excesses a preset duration.

The device for preventing false triggering on the touch button, may resolve the problem of false triggering to back to the main interface or interrupt the running application, and achieve the effect of reducing the false triggering.

In one implementation, the device 200 further includes a reporting unit 604. The reporting unit 604 is used to detect the touch operation on the touch button 1 and report the key value of the touch button 1 when the screen direction state is the second screen direction state.

In some implementations, the detecting unit 602 further includes an application obtaining unit and an event detecting unit. The application obtaining unit is used to obtain a type of a currently displayed application when the screen direction state is the first screen direction state. The event detecting unit is used to determine the touch operation when the type of the currently displayed application is a predefined application.

In some implementations, the detecting unit 602 further includes an information reporting unit, the information reporting unit is used to detect the touch operation on the touch button 1 and report the key value of the touch button 1 when the type of the currently displayed application is not the predefined application, after obtaining the type of the currently displayed application.

Based on the above implementations, in detail, the obtaining unit 601 is used to obtain the screen direction state via the standard interface of the first operating system when the operating system of the electronic device 100 is the first operating system.

Figure 8:
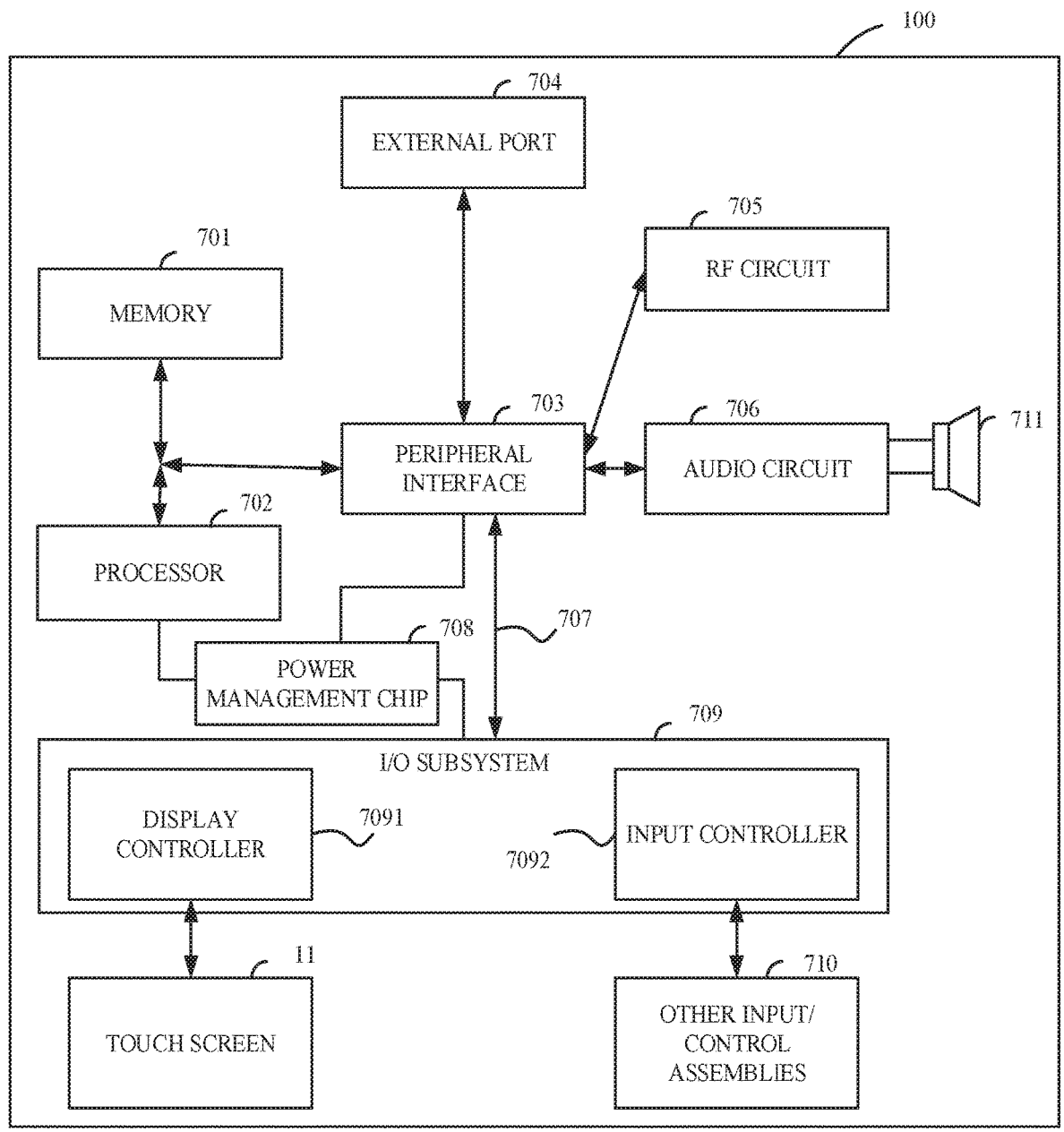
FIG. 8 is a structure diagram of an electronic device applying the method for preventing touch button from being false triggered, according to an implementation of the disclosure.

In one implementation, the electronic device 100 can include a shell (not illustrated), a processor (702, as illustrated in FIG. 8), a memory (701, as illustrated in FIG. 8), a circuit board (not illustrated), and a power circuit (e.g., a power management chip 708 as illustrated in FIG. 8).

The circuit board is set inside a space surrounded by the shell. The processor and the memory are set on the circuit board. The power circuit is used to supply power to the processor, the memory and other components of the electronic device 100. The memory stores a number of executable program codes. The processor is used to read the executable program codes stored in the memory and run the program corresponding to the executable program codes, thus to execute the following functions.

When detecting the touch button 1 of the electronic device 100 being touched, obtaining current screen direction state of the electronic device 100; when the screen direction state is the first direction state, determining a touch operation on the touch button 1 and judging whether the touch operation is a predefined touch operation; when the touch operation is the predefined touch operation, reporting a key value of the touch button 1 to response the touch operation on the touch button 1. Therein, the predefined touch operation can be a click operation with at least two click times, a touch operation whose pressure value excesses a preset pressure value, or a touch operation whose touch duration excesses a preset duration.

Therein, the obtaining unit 601, the detecting unit 602, the response unit 603, and the reporting unit 604 can be the executable program codes or executable program instructions stored in the memory.

Referring also to FIG. 8, a structure diagram of the electronic device 100 is illustrated. As illustrated in FIG. 8, in one implementation, the electronic device 100 may include but not limited to: a memory 701, a processor 702, such as a central processing unit (CPU), a peripheral interface 703, a Radio Frequency (RF) circuit 705, an audio circuit 706, a loudspeaker 711, a power management chip 708, an input/output (I/O) subsystem 709, the touch screen 11, other input/control assemblies 710, an external port 704, and other components. These components communicate with each other via one or more communication bus or signal lines 707. The power management chip 708 can be a core chip of the power circuit described above. The electronic device 100 further includes the touch button 1 as described above.

It should be understood that the electronic device 100 as illustrated in FIG. 8 is only an example and the electronic device 100 can include more or fewer components than that illustrated in FIG. 8. Two or more components as illustrated in FIG. 8 also can be integrated into one component, the components as illustrated in FIG. 8 also can be instead by other similar or different components. Each component as illustrated in FIG. 8 can be achieved as hardware, software, or a combination of hardware and software each including one or more signal processing/specific integrated circuit.

The electronic device 100, provided in one implementation, for preventing false triggering on the touch button 1 would be detail described as follows. In one implementation, the electronic device 100 is taken as a mobile phone for example.

The memory 701 can be accessed by the processor 702, the peripheral interface 703 and other components. The memory 701 may include a high-speed semi-random access memory, and may further include non-volatile memory, such as one or more disk storage, flash memories, or solid-state storage.

The peripheral interface 703 may connect an input/output peripheral device to the processor 702 and the memory 701.

The I/O subsystem 709 may connect input/output peripheral components of the electronic device, such as the touch screen 11, and other input/control assemblies 710 to the peripheral interface 703. The I/O subsystem 709 may include a display controller 7091 and one or more input controller 7092 for controlling the other input/control assemblies 710. Therein, the one or more input controller 7092 may receive electrical signals from the other input/control assemblies 710 or transmit the electrical signals to the other input/control assemblies 710. The other input/control assemblies 710 may include but not limited to: physical buttons (push buttons or rocker arm buttons), dial plates, slide switches, joysticks, and wheel buttons. It should be noted that, the input controller 7092 may connect to any one of a keyboard, an infrared port, a universal serial bus, and a pointing device such as a mouse.

The touch screen 11 is an input and output interface between the electronic device 100 and the user, the touch screen 11 may display visual content to the user, the visual content may include pictures, texts, icons, videos, etc.

The display controller 7091 of the I/O subsystem 709 may receive electrical signals from the touch screen 11 or transmit the electrical signals to the touch screen 11. The touch screen 11 is used to detect touch operations on it, the display controller 7091 is used to convert the detected touch operations to interactions with interface objects displayed on the touch screen 11, namely, achieve man-machine interactions. The interface objects displayed on the touch screen 11 can be a game icon for running the game, a network icon for connecting to a corresponding network, etc. It should be noted that, the pointing device further can include an optical mouse, the optical mouse may be an extended portion of a touch-sensitive surface without displaying the visual content, or a touch-sensitive surface formed by the touch screen 11.

The RF circuit 705 is used to establish a communication between the mobile phone and a wireless network, thus to achieve data transmission and receiving between the mobile phone and the wireless network. For example, sending or receiving message or e-mail. In detail, the RF circuit 705 is used to transmit or receive RF signals. The RF signal is also named as electromagnetic signals. The RF circuit 705 converts electrical signals to the electromagnetic signals or converts the electromagnetic signals to the electrical signals, and communicates with the wireless network or other devices via the electromagnetic signals. The RF circuit 705 may include a number of circuits for executing the function, the number of circuits include but not limited to: an antenna system, a RF transceiver, one or more amplifiers, a tuner, one or more oscillators, a digital signal processor, a CODEC (coder and decoder) chipset, a subscriber identity module (SIM) card, etc.

The audio circuit 706 is used to receive audio data from the peripheral interface 703, convert the audio data to electrical signals, and transmit the electrical signals to the loudspeaker 711.

The loudspeaker 711 is used to restore audio signals received from the wireless network via the RF circuit 705 to voice signals, and output the voice signals to the user.

The power management chip 708 is used to supply power to the processor 702, the I/O subsystem 709, and hardware connected by the peripheral interface 703.

In the implementation, the processor 702 can execute the above methods described in FIGS. 1-7. Therefore, the electronic device 100 can prevent false triggering on the touch button 1 effectively by using the processor 702 to execute any method for preventing the touch button 1 from being false triggered.

Implementations within the scope of the present disclosure may also include tangible and/or non-transitory computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design.

In one implementation, the tangible and/or non-transitory computer-readable storage media can be the memory 701, and the computer-executable instructions or data structures stored in the tangible and/or non-transitory computer-readable storage media can be executed by the processor 702 to cause the processor 702 to execute the above method for preventing false triggering on touch button as illustrated in FIGS. 1-7.

For example, the computer-executable instructions or data structures stored in the tangible and/or non-transitory computer-readable storage media can be executed by a computer to cause the computer to obtaining current screen direction state of the electronic device 100 when detecting the touch button 1 of the electronic device 100 being touched; determining a touch operation on the touch button 1 and judging whether the touch operation is a predefined touch operation when the screen direction state is the first direction state; reporting a key value of the touch button 1 to response the touch operation on the touch button 1 when the touch operation is the predefined touch operation. Therein, the predefined touch operation can be a click operation with at least two click times, a touch operation whose pressure value excesses a preset pressure value, or a touch operation whose touch duration excesses a preset duration.

Therein, the computer can be the electronic device 100, and can be a desktop computer, a mobile phone, a tablet computer, a portable computer, etc.

The foregoing description merely depicts some exemplary implementations of the disclosure and thus is not intended as limiting the scope of the disclosure. Any variations or substitutions that can be readily thought of by a person skilled in the art in light of the scope of the disclosure shall all be covered within the protection of the disclosure. Therefore, the scope of the disclosure is defined only by the appended claims.

What is claimed is:

1. A method for preventing touch button from being false triggered, comprising:
   upon detecting a touch button of the electronic device being touched, obtaining a screen direction state of an electronic device;
   in response to the screen direction state being a landscape state, determining a touch operation on the touch button and judging whether the touch operation is a predefined touch operation, wherein the predefined touch operation is at least one of a click operation with at least two click times, a touch operation having a pressure value that is greater than a preset pressure value, or a touch operation having a touch duration that is greater than a preset duration;
   in response to the touch operation being predefined touch operation, reporting a key value of the touch button to trigger a function of the touch button; and
   in response to the screen direction state being a portrait screen state, reporting the key value of the touch button to trigger the function of the touch button.

2. The method of claim 1, wherein determining the touch operation on the touch button and judging whether the touch operation is the predefined touch operation, when the screen direction state is the first direction state comprises:
   determining a type of a currently displayed application when the screen direction state is the first direction state; and
   determining the touch operation on the touch button and judging whether the touch operation is the predefined touch operation, when the type of the currently displayed application is a predefined application type.

3. The method of claim 2, further comprising:
   after determining the type of the currently displayed application, reporting the key value of the touch button to trigger the function of the touch button in response to the touch operation on the touch button, when the type of the currently displayed application is not the predefined application type.

4. The method of claim 2, wherein the predefined application type is one of a video player application type or a game application type.

5. The method of claim 1, wherein obtaining the screen direction state of the electronic device comprises:
   obtaining the screen direction state of the electronic device via a standard interface of a first operating system when an operating system of the electronic device is the first operating system.

6. The method of claim 1, wherein determining the touch operation on the touch button comprises:
   determining what the touch operation on the touch button is.

7. An electronic device, comprising:
   a touch button;
   a processor; and
   a memory storing a plurality of instructions, the plurality of instructions being executed by the processor and causing the processor to:
      obtain a screen direction state of the electronic device upon detecting a touch button of the electronic device being touched;
      in response to the screen direction state being a landscape state, determine a touch operation on the touch button and judge whether the touch operation is a predefined touch operation, wherein the predefined touch operation is at least one of a click operation with at least two click times, a touch operation having a pressure value that is greater than a preset pressure value, or a touch operation having a touch duration that is greater than a preset duration;

in response to the touch operation being the predefined touch operation, report a key value of the touch button to trigger a function of the touch button; and in response to the screen direction state being a portrait screen state, report the key value of the touch button to trigger the function of the touch button in response to the touch operation on the touch button.

8. The electronic device of claim 7, wherein the processor configured to determine the touch operation on the touch button and judge whether the touch operation is the predefined touch operation when the screen direction state is the first direction state is further configured to:

determine a type of a currently displayed application when the screen direction state is the first direction state; and determine the touch operation on the touch button and judge whether the touch operation is the predefined touch operation when the type of the currently displayed application is a predefined application type.

9. The electronic device of claim 8, wherein the instructions further cause the processor to:

report the key value of the touch button to trigger the function of the touch button when the type of the currently displayed application is not the predefined application type.

10. The electronic device of claim 8, wherein the predefined application type is one of a video player application type or a game application type.

11. The electronic device of claim 7, wherein the processor configured to obtain the current screen direction state of the electronic device is further configured to:

obtain the screen direction state of the electronic device via a standard interface of a first operating system when an operating system of the electronic device is the first operating system.

12. The electronic device of claim 7, wherein the processor configured to determine a touch operation on the touch button is further configured to:

determine what the touch operation on the touch button is.

13. The electronic device of claim 7, wherein the electronic device further comprises a touch screen with a touch area, and the touch button is outside of the touch area.

14. A non-transitory computer-readable storage medium, wherein the non-transitory computer-readable storage medium stores a plurality of instructions, when the plurality of instructions is executed by a computer, the computer is caused to execute a method for preventing touch button from being falsely triggered, the method comprising:

upon detecting a touch button of the electronic device being touched, obtaining a screen direction state of an electronic device;

in response to the screen direction state being a landscape state, determining a touch operation on the touch button and judging whether the touch operation is a predefined touch operation, wherein the predefined touch operation is at least one of a click operation with at least two click times, a touch operation having a pressure value that is greater than a preset pressure value, or a touch operation having a touch duration that is greater than a preset duration;

in response to the touch operation being the predefined touch operation, reporting a key value of the touch button to trigger a function of the touch button; and in response to the screen direction state being a portrait state, reporting the key value of the touch button to trigger the function of the touch button in response to the touch operation on the touch button.

* * * * *